(12) United States Patent
Ritter

(10) Patent No.: US 6,865,175 B1
(45) Date of Patent: Mar. 8, 2005

(54) METHOD AND CONFIGURATION FOR TRANSMITTING DATA OVER A RADIO INTERFACE IN A RADIO COMMUNICATIONS SYSTEM

(75) Inventor: Gerhard Ritter, Thaining (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/561,594

(22) Filed: Apr. 27, 2000

Related U.S. Application Data

(63) Continuation of application No. PCT/DE98/03061, filed on Oct. 19, 1998.

(30) Foreign Application Priority Data

Oct. 27, 1997 (DE) .......................................... 197 47 457

(51) Int. Cl.[7] .............................. H04J 3/00; H04L 7/00
(52) U.S. Cl. ...................................... 370/345; 375/355
(58) Field of Search ................................. 370/321, 326, 370/330, 332, 337, 345, 347; 375/229, 231, 232, 348, 355, 356, 364, 366

(56) References Cited

U.S. PATENT DOCUMENTS

| | | | |
|---|---|---|---|
| 5,185,764 A | | 2/1993 | Baier |
| 5,263,053 A | * | 11/1993 | Wan et al. ................... 375/341 |
| 5,303,223 A | * | 4/1994 | Sakaguchi et al. ........ 360/267.4 |
| 5,479,444 A | * | 12/1995 | Malkamaki et al. ........ 375/231 |
| 5,537,419 A | * | 7/1996 | Parr et al. .................... 370/350 |
| 5,537,438 A | * | 7/1996 | Mourot et al. ............... 375/231 |
| 5,566,172 A | * | 10/1996 | Mourot ........................ 370/347 |
| 5,606,580 A | * | 2/1997 | Mourot et al. ............... 375/231 |
| 5,621,737 A | * | 4/1997 | Bucher ........................ 714/704 |
| 5,805,638 A | * | 9/1998 | Liew ........................... 375/231 |
| 5,835,541 A | * | 11/1998 | Namekata et al. ........... 375/355 |
| 5,995,499 A | * | 11/1999 | Hottinen et al. ............. 370/337 |
| 6,002,719 A | * | 12/1999 | Parvulescu et al. ......... 375/240 |
| 6,212,243 B1 | * | 4/2001 | Klein et al. .................. 375/316 |
| 6,347,223 B1 | * | 2/2002 | Schreib ....................... 370/292 |
| 6,366,569 B1 | * | 4/2002 | Ritter .......................... 375/231 |

FOREIGN PATENT DOCUMENTS

| | | |
|---|---|---|
| DE | 4001592 A1 | 5/1991 |
| DE | 4136147 A1 | 5/1993 |
| EP | 0535403 A1 | 4/1993 |
| EP | 0615352 A1 | 9/1994 |
| EP | 0767557 A1 | 4/1997 |

OTHER PUBLICATIONS

Published International Application No. 96/42143 (Sohlman et al.), dated Dec. 27, 1996.
Published International Application No. 96/11533 (Hottinen et al.), dated Apr. 18, 1996.

* cited by examiner

*Primary Examiner*—Andy Lee
(74) *Attorney, Agent, or Firm*—Laurence A. Greenberg; Werner H. Stemer; Gregory L. Mayback

(57) ABSTRACT

A method and a configuration for transmitting data over a radio interface which is organized into timeslots with finite radio blocks in accordance with a TDMA subscriber separation method are described. In the method, radio stations transmit, within a timeslot, at least two training sequences that are known to a respectively receiving radio station and by which the latter carries out channel estimations. The training sequences are positioned here in timeslot in such a way that the maximum distance between a data symbol and a nearest training sequence is minimized.

7 Claims, 5 Drawing Sheets

METHOD AND CONFIGURATION FOR TRANSMITTING DATA OVER A RADIO INTERFACE IN A RADIO COMMUNICATIONS SYSTEM

CROSS-REFERENCE TO RELATED APPLICATION

This is a continuation of copending International Application PCT/DE98/03061, filed Oct. 19, 1998, which designated the United States.

BACKGROUND OF THE INVENTION

Field of the Invention

The invention relates to a method and a configuration for transmitting data over a radio interface in a radio communications system, in particular in a mobile radio system.

In radio communications systems, messages (for example voice, image information or other data) are transmitted using electromagnetic waves. The electromagnetic waves are irradiated here at carrier frequencies that lie in the frequency band provided for the respective system. In the global system for mobile communication (GSM), the carrier frequencies lie in the region of 900 MHz. For future radio communications systems, for example the universal mobile telecommunication system (UMTS) or other $3^{rd}$ generation systems, frequencies in the approximately 2000 MHz frequency band are provided.

The irradiated electromagnetic waves are attenuated owing to losses resulting from reflection, refraction and irradiation due to the curvature of the earth and the like. As a result, the reception power that is available at the receiving radio station drops. The attenuation is location-dependent and also time-dependent in the case of moving radio stations.

Between a transmitting and a receiving radio station there is a radio interface over which data are transmitted using the electromagnetic waves. A subscriber separation is carried out in the GSM mobile radio system in accordance with a time division multiplex method, the so-called time division multiple access (TDMA) method which is used in combination with a frequency multiplex method, a frequency division multiple access (FDMA) method.

In the GSM mobile radio system, a TDMA frame is divided into 8 timeslots. Data relating to communications links or signaling information are transmitted as radio blocks, so-called bursts, in the timeslots, midambles with known symbols being transmitted within a radio block. The midambles can be used in the manner of training sequences for receive-end tuning of the radio station. The receiving radio station carries out an estimation of the channel pulse responses for various transmission channels by use of the midambles. Because the transmission properties of the mobile radio channel are location-dependent and frequency-dependent, the receiving radio station can carry out equalization of the received signal by use of the training sequence.

As the speed of a mobile radio station increases, the transmission properties on the radio interface also change more quickly, with the result that equalization has to be adjusted more quickly. The TDMA subscriber separation method that is used in the GSM mobile radio system is configured only for a limited speed of the mobile radio station. Above the speed limit, the transmission properties change so quickly that appropriate adjustment of the equalization is no longer possible and there is a steep increase in transmission errors. In the GSM system which operates at approximately 900 MHz this upper limit lies at approximately 250 km/h. The GSM1800 system, which is changed only in terms of its operating frequency, has at approximately 1.8 GHz, on the other hand, a speed limit which is as low as approximately 125 km/h.

For the third-generation mobile radio systems, a frequency range between approximately 2 and 2.5 GHz is provided, which would lead to a further reduction in the maximum speed using the described technology.

To permit new application areas in which mobile stations move at very high speeds, such as for example high speed trains or satellites with a low orbit, to be opened up for second-generation and third-generation mobile radio systems, more rapid adjustment of the equalization is required at the receive end of the radio stations.

Published, European Patent Application EP 0 535 403 discloses a method for receiving digital data signals which are transmitted in timeslots using the TDMA method. The digital data signals each contain a number of symbols with a training sequence of symbols. After the digital data signals are stored, channel information is respectively determined from some of the digital data signals of a first timeslot and from some of the digital data signals of a second timeslot and is subsequently combined to form an estimated channel information value. The symbols of the digital data signal of the first timeslot are subsequently equalized and demodulated with the estimated channel information value.

Published, European Patent Application EP 0 767 557 discloses a method in which at least two training sequences of receiving radio blocks of a TDMA transmission method are used by a mobile station to determine a time position of the received signal. The determined time position is subsequently used to determine the location of the mobile station. The mobile station uses training sequences in radio blocks of its own communications link here or its own communications link and additionally one or more training sequences of further communications links which are known in the mobile station.

International Patent Disclosure WO 96/11533 discloses a method for signal detection in a TDMA system. In this method, multipath channel estimations for a first signal and at least of one further interference signal are determined using received training sequences. The first signal is subsequently detected using both the channel estimation of the first signal and the channel estimation of the further signal.

U.S. Pat. No. 5,185,764 discloses a receiver for receiving distorted data signals which vary over time. The receiver has, inter alia, a channel estimator that generates a channel information signal by use of a training signal that is transmitted together with the data signals, and by use of a representation of the training signal which is stored in the receiver.

SUMMARY OF THE INVENTION

It is accordingly an object of the invention to provide a method and a configuration for transmitting data over a radio interface in a radio communications system that overcome the above-mentioned disadvantages of the prior art methods and devices of this general type, which enables the transmission properties to be adjusted, even when the radio stations are moving at high speed.

With the foregoing and other objects in view there is provided, in accordance with the invention, a transmission method for a radio communications system, which includes:

providing at least two radio stations each transmitting and receiving data in a form of data symbols and relating to communications links, one of the at least two radio stations being embodied as a mobile radio station, and a radio interface for the radio stations being organized into timeslots in accordance with a time division multiple access (TDMA) subscriber separation method; and transmitting, via the radio stations, at least two training sequences, known to each receiving radio station, within a timeslot within finite radio blocks by which the receiving radio station carries out channel estimation, a maximum distance between a data symbol and a nearest training sequence being minimized by positioning of the training sequences in the timeslot.

In the method according to the invention for transmitting data over the radio interface in the radio communications system, the at least two radio stations each transmit and receive data relating to communications links, in the form of data symbols, one radio station being embodied as a mobile radio station. The radio interface between the radio stations is organized into timeslots with finite radio blocks in accordance with a TDMA subscriber separation method. The radio stations transmit, within one timeslot, the at least two training sequences that are known to the respectively receiving radio station. By use of the training sequences, the radio stations carry out channel estimations, the training sequences being positioned in the timeslot in such a way that the maximum distance between a data symbol and the nearest training sequence is reduced.

This method has the advantage that the changes in the transmission properties of the radio link can be determined at least twice within one timeslot by the radio stations, permitting data to be transmitted at a higher maximum speed of the mobile radio station. For this purpose, the training sequences are disposed in accordance with the method described within the timeslot in such a way that the maximum distance between the data symbol and the nearest training sequence is kept as small as possible because the distance directly influences an upper limit of the maximum speed.

In a first refinement of the invention, the radio stations carry out an interpolation and/or extrapolation of the channel estimations from the training sequences in the timeslot. The interpolation and/or extrapolation is carried out here for all components of the multipath propagation occurring during the transmission on the radio interface which can be resolved chronologically. This refinement has the advantage that the chronological variation of the transmission properties can thus be adjusted for the entire radio block in the timeslot, the extrapolation also enabling limited predictions to be made in relation to future transmission properties. When there are two or more training sequences, a linear interpolation and/or extrapolation is possible, whereas when there are three training sequences per timeslot a quadratic interpolation and/or extrapolation is possible.

In a second refinement, the length of timeslots is varied in comparison with the radio block structures known in the GSM mobile radio system, as a function of the number of training sequences in one timeslot, with the result that the data rate of the radio block can be kept constant independently of the number of training sequences. Exemplary doubling of the length of the timeslot when there are two training sequences produces a similar relation between the number of data symbols to the overall time of the timeslot as when there is a normal timeslot length and only one training sequence, with the advantage that this lengthened timeslot can easily be integrated into a known TDMA time frame.

In order to maintain or increase the data rate in a radio block, it is possible, in accordance with a further refinement, to shorten the length of the training sequences, the length of the timeslots being kept constant. Shortening of the length of the training sequences is possible and appropriate especially for applications such as high speed trains or satellites, because, for example, the fact that the rails or orbit are straight and that there are only a few or no obstacles on the radio link, multipath propagation (delay spread), i.e. the maximum possible delay time with which a data symbol can be received unambiguously by the radio station when there is multipath propagation, is significantly reduced.

In a further refinement of the invention, radio blocks of one or more communications links are combined to form a multiple radio block in an extended timeslot. Here, guard times are additionally used between the timeslots for transmitting data symbols or for data protection. This refinement can in turn be used advantageously, for example, in high speed trains and also in satellite communications. Because, as a rule, not just one communications link but rather a plurality of communications links have to be transmitted simultaneously between the base station and the high speed train, the data symbols of a plurality of active communications links are combined in one such multiple radio block and transmitted together in the extended timeslot. The higher number of the training sequences permits more rapid adjustment of the receiver-end equalization, and additional transmission capacities are provided by using the guard times. A careful selection of the length of the extended timeslot enables it to be integrated into a known TDMA time frame without difficulty.

In the method according to the invention for transmitting the data over the radio interface in the radio communications system, the at least two radio stations each transmit and receive data relating to the communications links, in the form of data symbols, one radio station being embodied as a mobile radio station. The radio interface between the radio stations is organized into timeslots with finite radio blocks in accordance with the TDMA subscriber separation method. The radio stations transmit, within a timeslot that is assigned to a communications link, at least one training sequence that is known to the respectively receiving radio station. The mobile radio station carries out channel estimations by use of the training sequence in the timeslot, and by use of at least one further known training sequence which is transmitted in at least one further timeslot which is assigned to at least one further communications link.

The radio station can advantageously carry out more rapid adjustment of the transmission properties because channel estimations for the radio block transmitted in a respective timeslot are based on at least two training sequences.

In a first refinement of the invention, the mobile radio stations and/or the radio station carries out an interpolation and/or extrapolation of the channel estimations. This refinement has the advantage that the additional variation of the transmission properties for the entire radio block in the timeslot can be adjusted, the extrapolation also permitting limited predictions relating to future transmission properties to be made. When there are two or more training sequences, a linear interpolation and/or extrapolation is possible, whereas when there are three training sequences per timeslot a quadratic interpolation and/or extrapolation is possible.

In a second refinement of the invention, the training sequences are transmitted at the transmitting radio station end with a greater constant transmission power than the average transmission power for the data symbols.

As a result of this refinement, the mobile radio station can carry out precise channel estimations relating to the transmission properties independently of the location and the power control for other mobile radio stations whose training sequences are used for the channel estimations in the other timeslots. Furthermore, the greater transmission power permits the average signal-to-noise ratio to be improved when the training sequences are being received.

As an alternative to this refinement, it is possible, according to a further refinement of the invention, for the transmission power for the training sequences to correspond to the transmission power for the data symbols. The mobile radio station carries out a correction of the transmission power for the training sequences in the further timeslots by use of a correction factor transmitted by the radio station, and subsequently carrying out channel estimations. This refinement enables the mobile radio station to carry out, as described above, precise channel estimations relating to the transmission properties independently of the location and the power control for the transmission of data symbols to the other mobile radio stations.

In a further refinement of the invention, radio blocks of one or more communications links are combined to form a multiple radio block in an extended timeslot. The mobile radio station carrying out channel estimations in the multiple radio block or in the multiple radio block and in at least one further timeslot by use of the training sequences. This refinement advantageously permits very precise channel estimation because the radio station transmits the training sequences in the multiple radio block with the same transmission power.

Other features which are considered as characteristic for the invention are set forth in the appended claims.

Although the invention is illustrated and described herein as embodied in a method and a configuration for transmitting data over a radio interface in a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
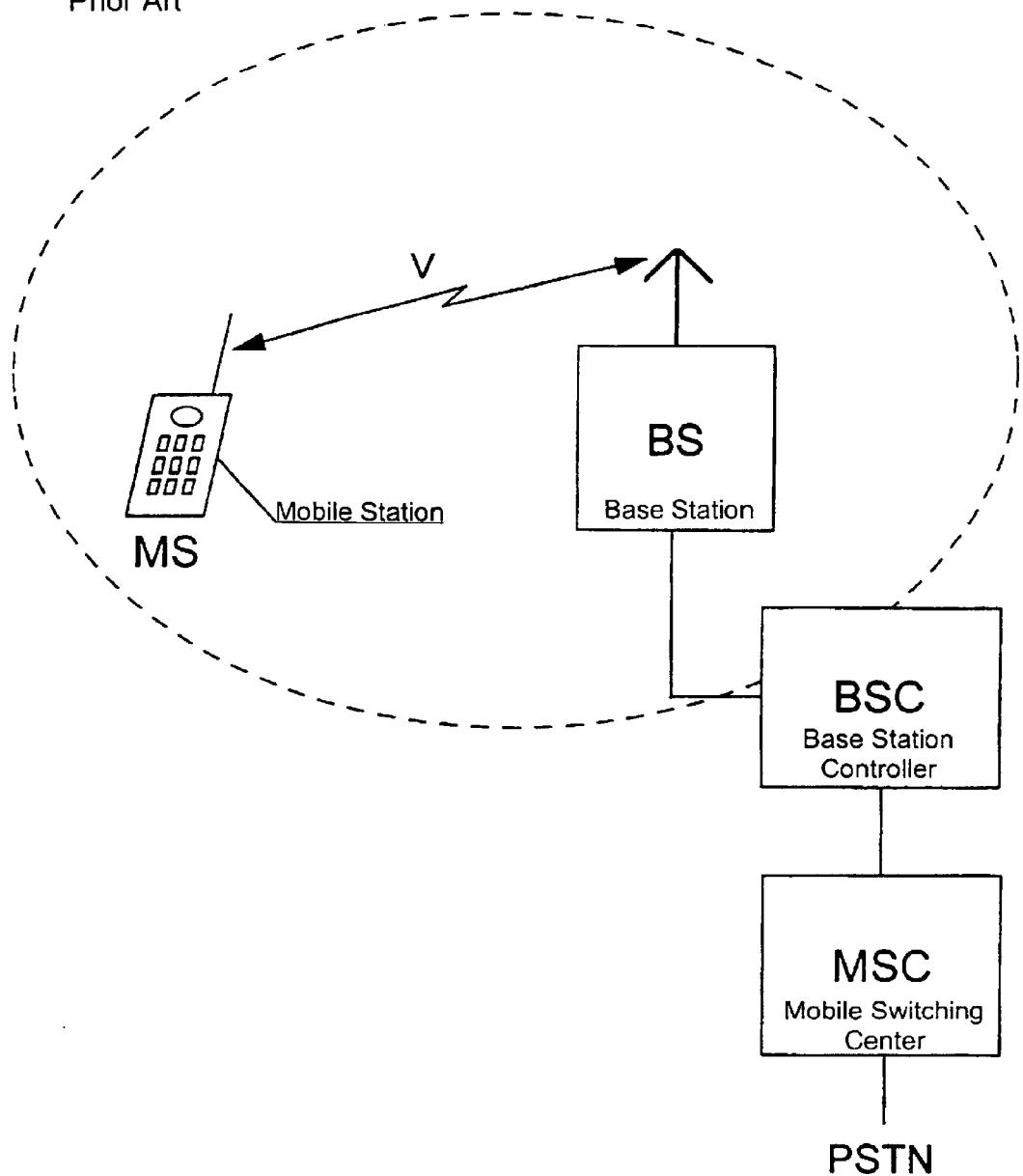
FIG. 1 is a block circuit diagram of a known radio communications system, in particular of a mobile radio system.

In all the figures of the drawing, sub-features and integral parts that correspond to one another bear the same reference symbol in each case. Referring now to the figures of the drawing in detail and first, particularly, to FIG. 1 thereof, there is shown a radio communications system that corresponds in its structure to a known GSM mobile radio network which is composed of a multiplicity of mobile switching centers MSC which are networked to one another and/or provide access to a fixed network PSTN. In addition, the mobile switching centers MSC are connected to at least one base station controller BSC in each case. Each base station controller BSC in turn enables a connection to be made to at least one base station BS. The base station BS is a radio station which can set up communications links to mobile radio stations MS over a radio interface.

FIG. 1 illustrates by way of example a communications link V for transmitting useful data and signaling information between the mobile radio station MS and the base station BS.

The functionality of this structure is used by the radio communications system according to the invention.

The base station BS is connected to an antenna device that is composed, for example, of three individual radiators. Each of the individual radiators radiates directionally into a sector of the radio cell that is supplied by the base station BS. However, as an alternative, a higher number of individual radiators (as in adaptive antennas) can also be used with the result that a spatial subscriber separation according to an space division multiple access (SDMA) can also be used.

Figure 2:
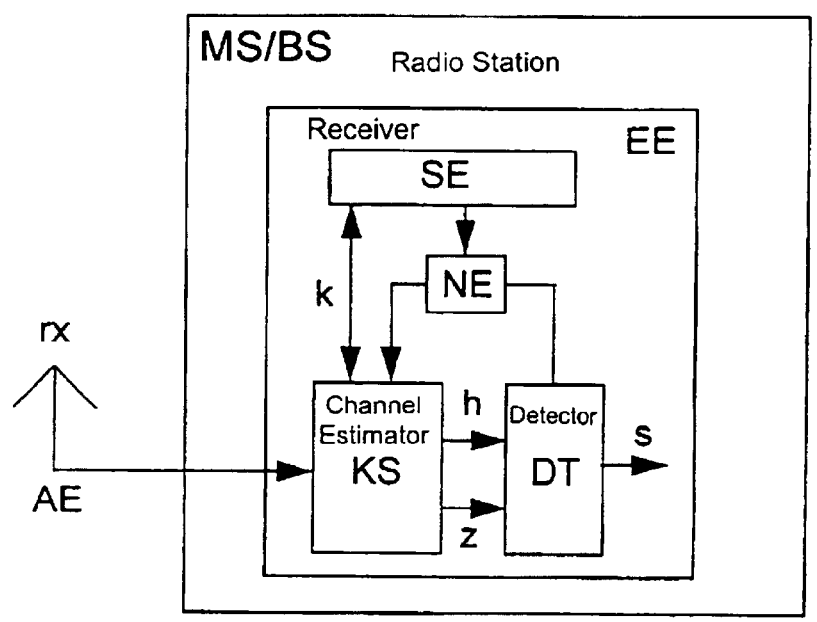
FIG. 2 is a block circuit diagram of the radio station with components for a reception path that are implemented therein according to the invention.

The exemplary structure of the base station BS or radio station MS is illustrated in FIG. 2, with only the components which are relevant for the reception path being illustrated. However, it is usually composed of a double-ended traffic connection, i.e. the base station BS or the radio station MS has, as it were, a transmitter device.

Received signals rx which arrive impaired by multipath propagation, interference and delay are received via an antenna device AE and fed to a receiver device EE. Digital signals, which are fed to a channel estimator KS within the receiver device EE, are generated from the received signals rx in the receiver device EE by, for example, transmission into the baseband and subsequent analog/digital conversion. The channel estimator KS is connected to a detector DT and supplies it with antenna data z which is derived from the digital received signals rx and with channel coefficients h which are determined in the channel estimator KS. The detector DT, which is embodied for example as a Viterbi Detector, carries out equalization and data detection of the antenna data z using the channel coefficients h and generates symbols s which are fed to further devices in the receiver device EE. In these further devices, decoding and, if appropriate, further processing procedures are subsequently carried out. The symbol s represents the reconstructed signals of the transmit end.

A control device SE is connected to the channel estimator KS and evaluates correlation values k which are generated during the channel estimation and which form the basis for the determination of the channel coefficients h. As a function of this evaluation, the channel estimation is controlled in such a way that values determined by the detector DT are optionally included in the channel estimation by an adjustment unit NE.

Figure 3:
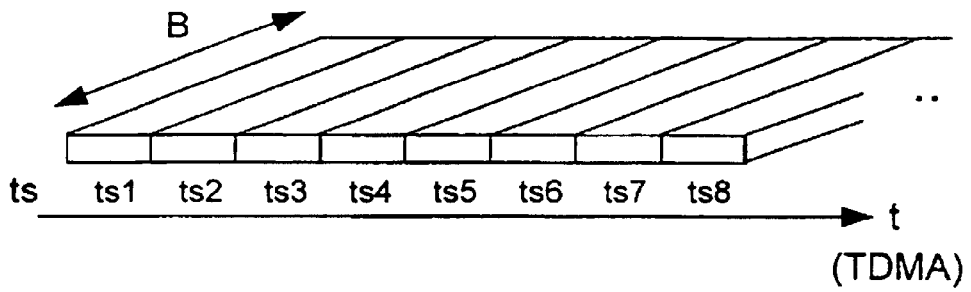
FIG. 3 is a schematic illustration of a frame structure in a TDMA subscriber separation method.

The frame structure of the radio interface is apparent from FIG. 3. According to a TDMA component, there is provision for one frequency range in each case to be divided into a plurality of timeslots ts, for example 8 timeslots ts1 to ts8. Each timeslot ts within the frequency range B forms a frequency channel. Within the frequency channels that are provided for data transmission, information relating to a plurality of links is transmitted in radio blocks. According to one FDMA (Frequency Division Multiple Access) component, a plurality of frequency ranges B are assigned to the radio communication system.

Within one frequency range B, the successive timeslots ts are placed in a frame structure. Thus, eight timeslots ts are combined to form one frame, a specific timeslot ts of the frame forming a frequency channel for data transmission and being used recurrently by a group of communications links. Further frequency channels, for example, for frequency or time synchronization of the mobile radio stations MS, are not inserted into each frame but rather at predefined time points within a multiframe. The distances between these frequency channels determine the capacity that the radio communications system makes available for them.

Figure 4:
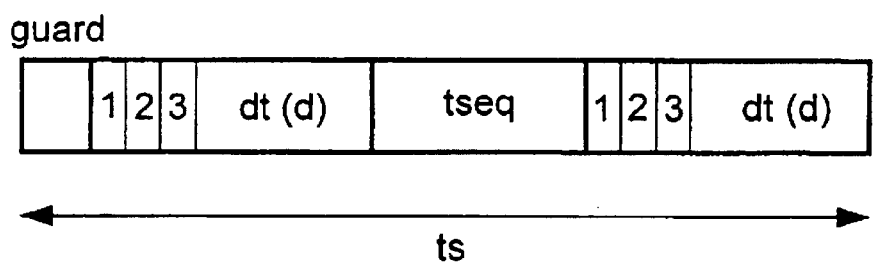
FIG. 4 is a schematic illustration of a timeslot with a training sequence.

According to FIG. 4, the radio blocks for transmitting data are composed of data components dt having a plurality of data symbols d in which sections with midambles which are known at the receive end from the GSM mobile radio system are, as a rule, symmetrically embedded and in which the training sequences tseq are also transmitted. Furthermore, within the timeslot ts a guard time guard is provided for compensating different signal propagation times of the communications links of successive timeslots ts.

Figure 5:
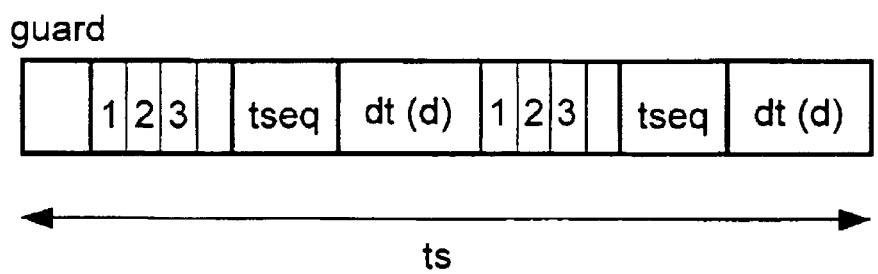
FIG. 5 is a schematic illustration of the timeslot with two training sequences.

In FIG. 5, the timeslot ts with two training sequences tseq embedded in it is illustrated by way of example. The training sequences tseq are disposed here in such a way that the greatest distance between the data symbols d and a training sequence tseq is minimized. When there are, for example, 16 data symbols per timeslot ts, a training sequence tseq is disposed after every 4 or 12 data symbols so that the maximum distance between a data symbol d and the nearest training sequence tseq is at maximum 3 data symbols d. Owing to the fact that two or more training sequences tseq are disposed in one timeslot ts, the data rate for the transmission of data symbols can be restricted. This restriction can, however, be compensated, for example, by a proportional chronological expansion of the timeslot ts or by using chronologically shorter training sequences tseq.

Figure 6:
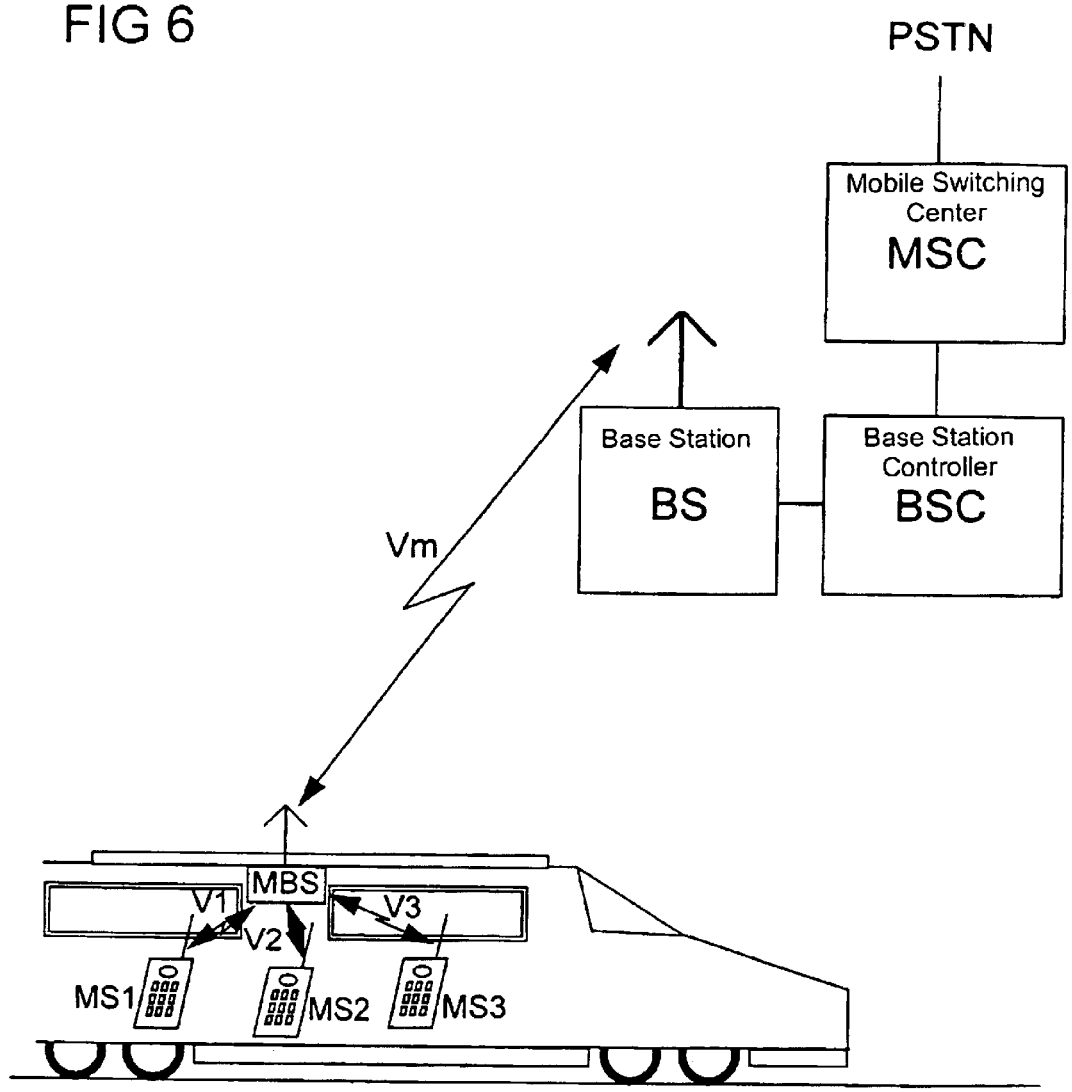
FIG. 6 is a block circuit diagram of a radio communications system for application in high speed trains.

FIG. 6 shows an exemplary application of the invention for high speed trains. In this application, the training sequences tseq are chronologically shortened in a specific area because the radio link between the base station BS which is usually disposed at an exposed location or near to the tracks, and the train is disrupted by only a small number of obstacles or geographical impediments, and the delay spread is thus relatively small. The same applies to the application of the invention for satellite communication.

Figure 7:
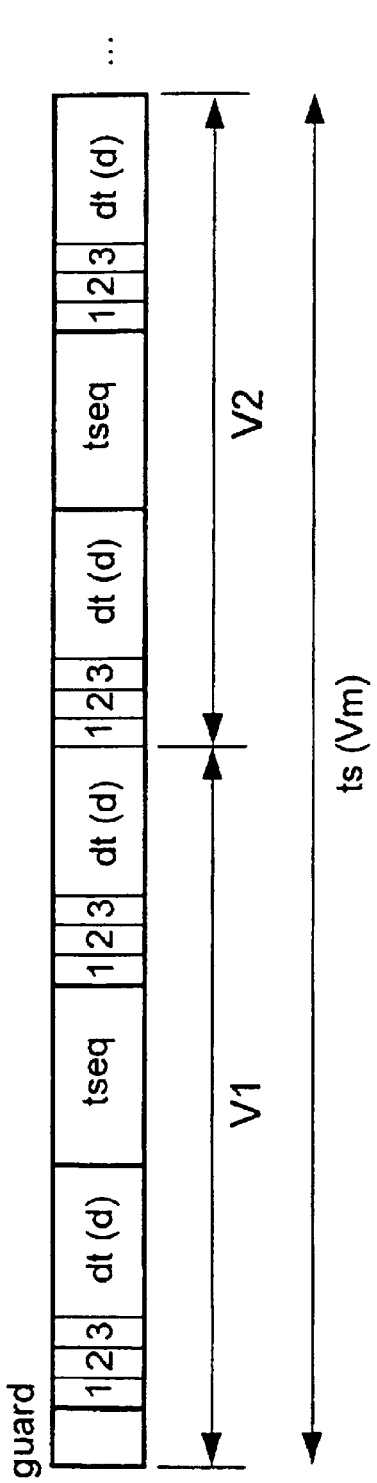
FIG. 7 is a schematic illustration of a multiple radio block.

In view of the large number of passengers in a high speed train, it is very probable that a plurality of communications links V1, V2, V3 from or to a plurality of mobile stations MS1, MS2, MS3 will occur simultaneously within the train. This bundled occurrence of outgoing and incoming radio blocks can be used very advantageously in such a way that the radio blocks of the communications links V1, V2, V3 are combined wholly or in part in a mobile base station MBS within the train to form one multiple radio block Vm. Such a multiple radio block is advantageously illustrated in FIG. 7.

In the multiple radio block, the data symbols d of the two communications links V1 and V2 from/to the mobile stations MS1 and MS2 are combined and transmitted in an expanded timeslot ts. The guard time guard that is normally provided between the timeslots ts can additionally be used here for transmitting data symbols of one link or of both links or for expanded data protection.

Such an expanded timeslot ts can be integrated without difficulty into a time frame of a time division multiplex method. The receiving base station BS and the mobile base station MBS use the training sequences tseq transmitted in the multiple radio block Vm for the channel estimations, each communications link being assigned at least one subscriber sequence tseq. On the basis of the training sequences in the timeslot ts, the base station BS or the mobile base station MBS can, as is also the case illustrated in FIG. 5 with the at least two training sequences tseq within a normal timeslot ts, carry out channel estimations by the training sequences tseq and adjust the equalization of the received signal in accordance with the transmission properties on the radio link.

Figure 8:
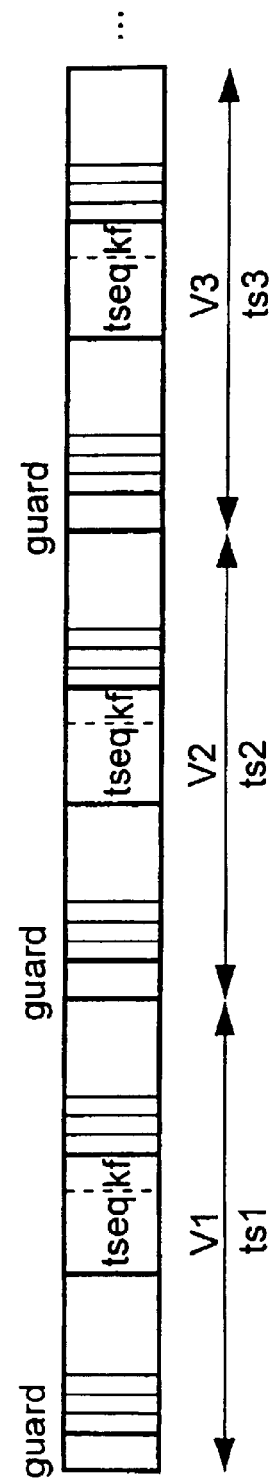
FIG. 8 is a schematic illustration of a plurality of successive timeslots.

FIG. 8 relates to the method according to the invention and the advantageous refinements based on it. Here, data are transmitted on the radio interface using a conventional TDMA subscriber separation method. One training sequence tseq is embedded in each of the timeslots ts1, ts2 and ts3.

The timeslots ts1 to ts3 can each be assigned to one or more communications links. In the example illustrated, radio blocks of, in each case, one communications link V1, V2, V3 are transmitted on the downlink from and respectively to different mobile stations MS1, MS2, MS3 in one timeslot ts1, ts2, ts3 in each case.

In order to carry out channel estimations, the mobile station MS2 does not, for example, use just the training sequence tseq which is transmitted in the timeslot ts2 assigned to it but also the training sequence tseq, known to it, of the respectively preceding timeslot ts1 and following timeslot ts3 in which radio blocks are transmitted to the mobile stations MS1 and MS2. By performing an additional interpolation and/or extrapolation, the mobile station MS2 can thus carry out a precise adjustment of the equalization of the received signals in accordance with the changes of the transmission conditions on the radio link.

Because in most cases the radio blocks are transmitted from the base station BS to the mobile stations MS1, MS2 and MS3 with a different transmission power in each case, owing to different locations of the mobile stations. The mobile stations MS1, MS2, MS3 continuously change their locations so that in each case a correction factor kf, is transmitted by the base station BS, together with the training sequence tseq for example. When the transmission power is regulated in discrete intervals, the correction factor kf may be a defined multiplication factor which indicates with what transmission power or with what multiple of the smallest transmission power increment the radio block is transmitted in the respective timeslot ts from the base station BS to the mobile station MS. The mobile station MS can take this correction factor kf into account in determining the precise transmission power of the training sequences tseq in timeslots ts assigned to the further mobile stations MS, and can include the result in the channel estimations in order to obtain a more precise result.

This problem can, however, also be solved by the base station BS transmitting the training sequences tseq in each case constantly with a greater transmission power than the average transmission power for the data symbols. As a result, the transmission of a correction factor becomes superfluous and the signal-to-noise ratio at the receiver inputs of the mobile stations MS is advantageously increased.

I claim:

1. A transmission method for a radio communications system, which comprises:

providing at least two radio stations each transmitting and receiving data in a form of data symbols and relating to communications links, one of the at least two radio stations being embodied as a mobile radio station, and a radio interface for the radio stations being organized into timeslots in accordance with a time division multiple access (TDMA) subscriber separation method; and transmitting, via the radio stations, at least two training sequences, known to each receiving radio station, within a timeslot within finite radio blocks by which the receiving radio station carries out channel estimation, a maximum distance between a data symbol and a nearest training sequence being minimized by positioning of the training sequences in the timeslot.

2. The method according to claim 1, which comprises carrying out at least one of an interpolation and an extrapolation of the channel estimation derived from the training sequences within the timeslot in the receiving radio station.

3. The method according to claim 1, which comprise varying a length of the timeslots in dependence on a number of the training sequences.

4. The method according to claim 1, which comprises combining the radio blocks of one or more of the communications links to form a multiple radio block in an expanded timeslot, and guard times being additionally used between the timeslots for transmitting the data symbols and for data protection.

5. A radio communications system, comprising:
at least two radio stations each transmitting and receiving data in a form of data symbols and relating to communications links, one of said at least two radio stations being a mobile radio station, and a radio interface between said radio stations being organized into timeslots in accordance with a time division multiple access (TDMA) subscriber separation method, at least two training sequences, known to each receiving radio station, being transmitted by said radio stations within a timeslot within finite radio blocks by which said receiving radio station carries out channel estimation, a maximum distance between a data symbol and a nearest training sequence being minimized by positioning of said training sequences in said timeslot.

6. The radio communications system according to claim 5, wherein said two radio stations form a mobile radio system and said mobile radio station is a mobile base station.

7. The radio communications system according to claim 5, wherein said two radio stations form a mobile radio system and said mobile radio station is a mobile station.

* * * * *